United States Patent [19]

Bachmann et al.

[11] Patent Number: 4,756,825

[45] Date of Patent: Jul. 12, 1988

[54] APPARATUS FOR PURIFYING HYDROGEN-FREE FLUORINATED LUBRICANTS

[75] Inventors: Paul Bachmann; Hanns-Peter Berges; Dieter Götz, all of Cologne, Fed. Rep. of Germany

[73] Assignee: Leybold-Heraeus GmbH, Cologne, Fed. Rep. of Germany

[21] Appl. No.: 854,855

[22] Filed: Apr. 22, 1986

[30] Foreign Application Priority Data

Dec. 6, 1985 [DE] Fed. Rep. of Germany ....... 3543162

[51] Int. Cl.$^4$ ..................... B01D 15/00; B01D 19/00
[52] U.S. Cl. ........................................ 210/90; 210/93; 210/96.1; 210/103; 210/143; 210/196
[58] Field of Search ............... 210/662, 664, 85, 96.1, 210/175, 180–186, 257.1, 259, 266, 90, 93, 97, 143, 196, 103, 120

[56] References Cited

U.S. PATENT DOCUMENTS 3,448,042  6/1969  Mattia et al. .................. 210/664
3,870,033  3/1975  Faylor et al. .................. 210/900

FOREIGN PATENT DOCUMENTS 3237930  4/1984  Fed. Rep. of Germany .

Primary Examiner—Ivars Cintins
Attorney, Agent, or Firm—Felfe & Lynch

[57] ABSTRACT

Disclosed is a system for separating impurities from a hydrogen-free fluorinated lubricant. The lubricant is passed through a filter apparatus containing an adsorbing material. The lubricant is then passed into a degasser unit to remove volatile impurities from the lubricant. The degassing unit has an area of closed suction. A pressure measuring device measures the pressure in the closed area and, based on this measurement, a control apparatus controls the degassing unit. A monitoring unit monitors the quality of the filtered lubricant.

7 Claims, 2 Drawing Sheets

APPARATUS FOR PURIFYING HYDROGEN-FREE FLUORINATED LUBRICANTS

The invention relates to an apparatus for the separation of impurities, preferably hydrocarbon impurities, from chemically inert lubricants such as perfluorinated polyethers, chlorofluorocarbons or the like, with the aid of a filter means.

In the chemical industry, in aeronautical and space technology and in vacuum technology, it is known to use perfluorinated polyethers or saturated, hydrogen-free chlorofluorocarbons (polytrifluorochloroethylene) as lubricants. The use of these lubricants or sealants is practiced whenever the use of inert lubricants is required. This is the case, for example, when oxygen-rich gases are to be pumped. If the otherwise commonly used mineral oils containing hydrocarbons were to be used in this case there would be a danger of explosion.

Perfluorinated polyethers are marketed, for example, under the commercial name of "Fomblin" (trademark of Montedison) and chlorofluorocarbons are obtainable on the market under the commercial name "Halocarbon" (trademark of Halocarbon Products Company). Additional products equivalent to "Fomblin" are "Krytox" (DuPont), "Demnum" (Daikin), "Tyrenofluid" (Tyrenochemie), etc.

During operation, the lubricant becomes contaminated with a wide variety of substances, e.g., solids, liquids, gases and vapors. It is the object of the invention to purify contaminated lubricants of the kind mentioned above, and thus to make them reusable.

From DE-PS No. 32 37 930 it is known to purify lubricants of the kind in question by heating, mixing with powdered charcoal and then filtering. A thorough elimination of hydrocarbon and mineral oil contaminants, however, is not possible by this method. Therefore it is furthermore proposed in that patent to dissolve the lubricant first in a chlorofluorinated hydrocarbon, then add a grease solvent, and separate the fluorinated lubricant thus precipitated. This chemical purification method is relatively expensive and has therefore been performed heretofore only on a laboratory scale.

The present invention is addressed to the problem of creating an apparatus of the kind described above, whereby the cleaning of fluorinated lubricants will be possible without the use of solvents or precipitating agents.

This problem is solved according to the invention by constructing the filter system as a deep-bed filter containing an adsorbing agent as filter material. It has been found surprisingly that a filter means of this kind not only is capable of retaining mechanical impurities, but also and especially of separating hydrocarbon contaminants from the inert lubricants. If the filter bed is made sufficiently deep, or if the contaminated lubricant is made to flow repeatedly through the filter bed, the result is a colorless and odorless fluid having the same physical properties (viscosity, index of refraction, neutralization number, density) as the starting substance.

An adsorbing agent, e.g., activated aluminum oxide, which can be in the form of activated alumina or activated bauxite, serves as the filter material. Bleaching earth, clay minerals such as, for example, bentonite, silica gel and the like, are also suitable as filter materials.

Granular filter materials of this kind have a large specific surface area. Also, they have a high adsorptivity for the dissolved impurities. Aluminum oxide, especially, has a high adsorptivity for dissolved hydrocarbons. Other liquid impurities such as $TiCl_4$ (titanium tetrachloride) are retained. Lastly, the filter material is capable of retaining solid particles with a grain size down into the submicron range.

It is advantageous to provide a degassing stage in the line leading to the filter system, preferably one with a heater. As a result of the lower pressure and elevated temperature, easily boiling or even sublimating components (e.g., HF, HCl, $C_2Cl_6$) are separated in this stage.

It is especially advantageous to use as the purifying apparatus a commercial, lubricant-sealed displacement-type vacuum pump equipped with a purifying circuit for the lubricant. For the desired purifying effect it is required that a filter system using activated aluminum oxide as filter material be provided in this purifying circuit. The lubricant in such a vacuum pump constantly flows in a circuit running from the oil tank, which is usually under atmospheric pressure, through a pump and the filter system to the low-pressure side of the vacuum pump and back through the pump discharge into the oil tank. In this circuit, therefore, both the desired filtration and a vacuum degassing take place. Usually the operation of vacuum pumps also involves a raising of the temperature of the lubricant, so that the degassing in the reservoir takes place at elevated temperature.

The vacuum pump is best provided with a gas ballast system. When the gas ballast is opened, an intensive mixing of the infed air with the volatile substances takes place, so that they are rapidly and effectively removed from the lubricant.

The various features of novelty which characterize the invention are pointed out with particularity in the claims annexed to and forming a part of this specification. For a better understanding of the invention, its operating advantages and specific objects obtained by its use, reference should be had to the accompanying drawings and descriptive matter in which there is illustrated and described a preferred embodiment of the invention.

Figure 1:
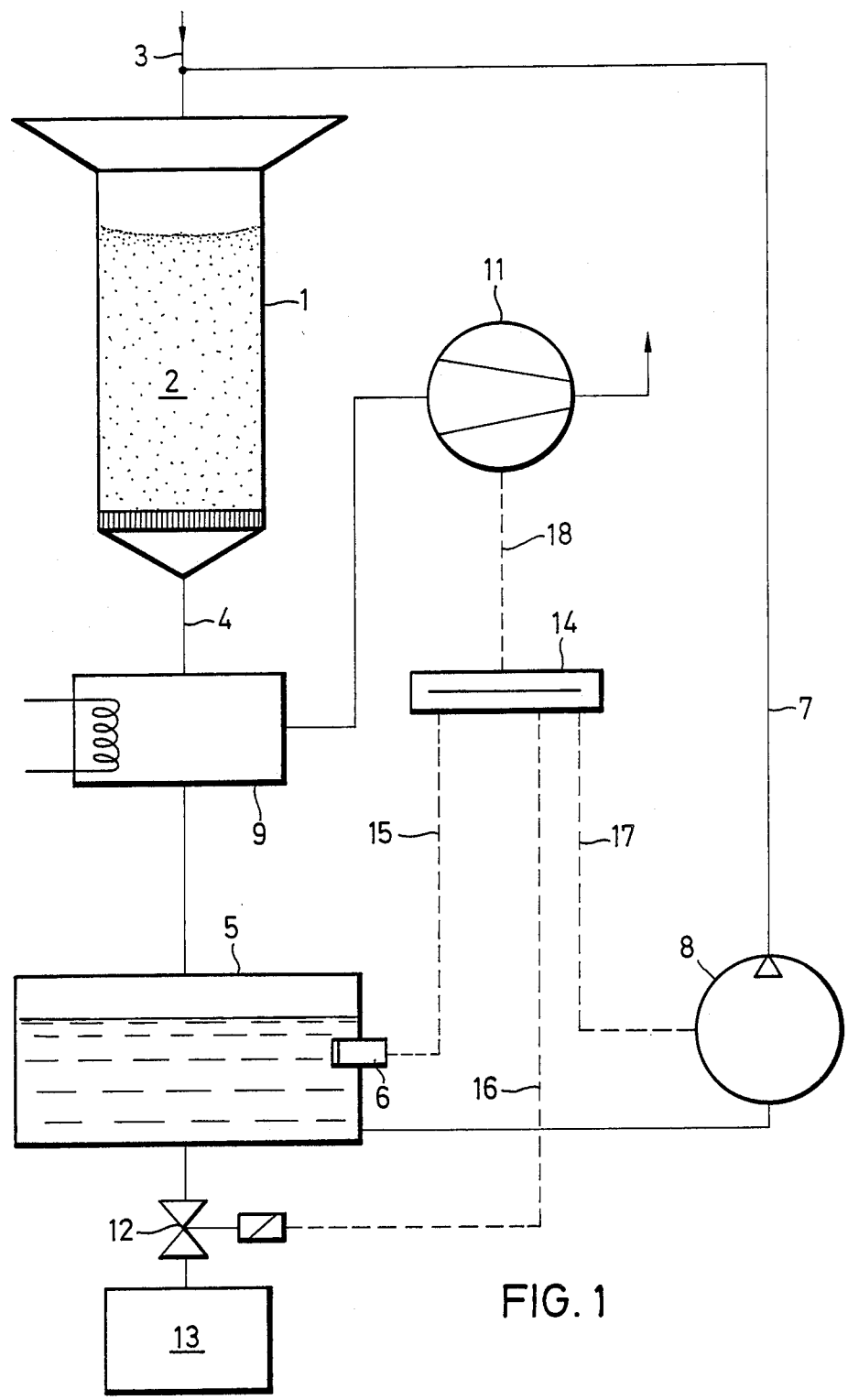
FIG. 1 is a schematic representation of the invention.

The number 1 identifies a bed filter containing activated aluminum oxide as filter material.

Contaminated fluorinated lubricant is introduced into the filter means 1 at 3. It leaves it through the outlet 4 which leads through the degassing stage 9 into the tank 5. The latter is equipped with a sensor 6, e.g., a turbidity meter, by which the lubricant can be inspected for quality.

The vacuum pump 11 is connected to the degassing stage 9, which is represented diagrammatically in the form of a block. The separation of volatile and condensable impurities from the contaminated lubricant is performed in this stage 9.

If the desired degree of purity is not achieved after one pass, the lubricant is fed back through line 7 to the filter 1, by means of the feed pump 8.

If the sensor 6 signals that the desired degree of purity is reached, the purified lubricant is let out through valve 12 into the receiving tank 13.

It is desirable for the operation of the apparatus described to be performed automatically. For this purpose a central control unit 14 is provided, to which the signals from the sensor 6 are fed through line 15. The actuation of the valve 12 and the starting and stopping of the feed pump 8 and of the vacuum pump 11 are controlled through the control lines 16, 17 and 18 on the basis of these signals.

Figure 2:
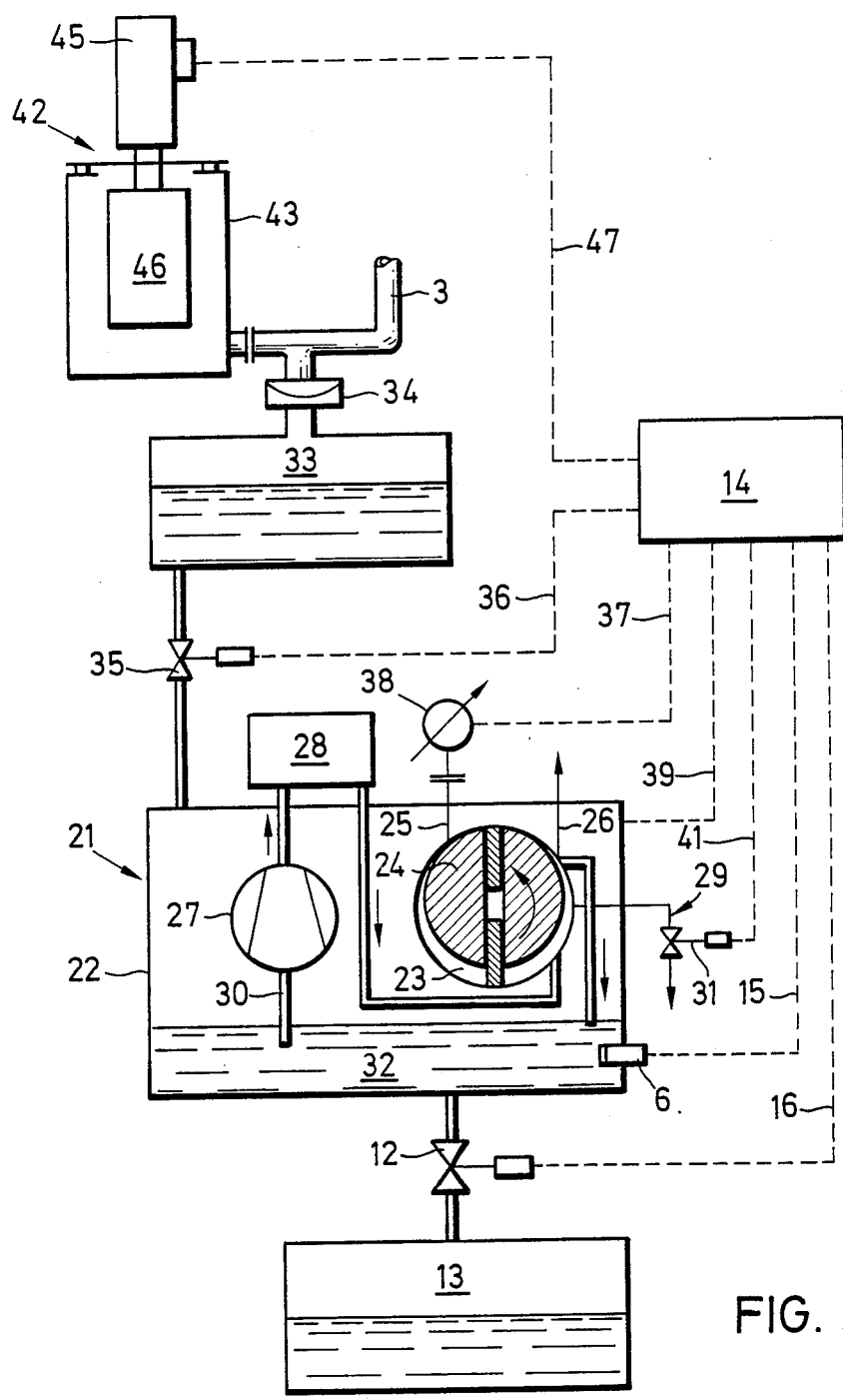
FIG. 2 depicts an alternate embodiment of the invention.

FIG. 2 shows an embodiment in which a displacement-type vacuum pump 21 is used for the purification of the fluorinated lubricant. A diagrammatically represented rotary sliding-vane vacuum pump is chosen as an example, and its casing is designated at 22, its low-pressure side at 23, rotor at 24, suction at 25 and discharge at 26. Moreover, the vacuum pump 21 is equipped with a lubricant circuit which includes the line 30 as well as the pump 27 and the filter 28. Lastly, the vacuum pump has a gas ballast system 29 which includes the valve 31. In the embodiment represented, the entire amount of lubricant delivered by the feed pump 27 passes through the filter 28 (main filter). The filter can also be disposed in a bypass (bypass filter).

The lubricant to be purified, which is situated in the oil sump 32, is transported by the feed pump 27 through the filter 28. This filter 28 again contains an adsorbing agent, preferably activated aluminum oxide, as filter material.

From there the lubricant enters the low-pressure area 23. The inlet of the vacuum pump remains closed during the purifying operation.

In the low-pressure area the evaporation of the volatile and condensable impurities takes place, as a result of the low pressure and of the elevated temperature usually involved in the operation of the vacuum pump. The removal of the volatile substances is promoted by turning on the gas ballast 29. During the purification, therefore, the valve 31 is opened.

Lubricant purified in the filter 28 and degassed in the low-pressure side 23 passes through the outlet 26 back into the oil sump 32. The latter is equipped with sensor 6 which monitors the quality of the lubricant. If the desired degree of purity is not yet reached, the vacuum pump 21 remains in operation. When the desired degree of purity is reached, the feed pump 21 is turned off and the purified lubricant is removed through valve 12 into the receiving tank 13.

A collecting tank 33 for contaminated lubricant is situated ahead of the vacuum pump 21. The lubricant is fed to it for purification through the line 3 and the coarse filter 34. From there it is fed discontinuously through valve 35 to the vacuum pump 21.

The number 14 again identifies a central control and regulating unit which makes possible an automatic purification process. The control line 36 serves for the actuation of the valve 35. The number 37 identifies a line which leads to a pressure measuring apparatus 38 connected to the inlet 25 of the feed pump. Data on the vacuum achieved are delivered thereby to the central unit 14. The starting and stopping of the vacuum pump 21 is performed through the line 39. The feed pump 27 is turned on and off simultaneously therewith. Lastly, the control line 41 permits the turning on and off of the gas ballast 29. The control lines 15 and 16 serve, as in the embodiment according to FIG. 1, for the delivery of information on the degree of purity of the liquid from the sensor 6 to the control unit 14 and for the operation of the valve 12.

The purification process can begin, for example, by letting the desired amount of lubricant through the valve 35 into the vacuum pump 21. This amount corresponds to the amount of lubricant which the selected vacuum pump usually requires.

Then the vacuum pump 21 is started up with valves 12 and 35 closed and the gas ballast valve 31 open, until the sensor 6 indicates that the desired degree of purity is reached.

By means of the sensor 6, and also of the pressure measuring instrument 38, the purifying effect can be constantly monitored. The pressure measuring instrument 38 constantly signals the pressure that has been reached to the central unit 9. From these pressure values it is possible to conclude whether volatile or condensable substances are present, especially when the gas ballast valve 31 is closed for the pressure-measuring period.

If the sensor 6 and the pressure measuring instrument 40 signal values indicating that the desired degree of purity has been reached, feed pump 21 is shut off. Then the purified lubricant is let out through the valve 12 into the receiving tank 13 and, after valve 12 is closed, contaminated lubricant is again let into the vacuum pump 21 through the valve 35.

The vacuum pump used should have the lowest possible total end pressure. Also, the ratio of the amount of gas ballast to suction capacity should be as great as possible. The pumping temperature should be as high as possible in gas ballast operation. Otherwise, the type of pump to be selected will depend on the amount of fluorinated lubricant that occurs and is to be purified.

The special advantage of the invention is that the purification of the fluorinated lubricant can be automated. Since a commercially available vacuum pump can be used the purification of the lubricant can be performed directly by the user. The expense is minimal in comparison to the previously known purification methods.

In an advantageous further development of the invention a centrifuge 42 is placed ahead of the collecting tank 33. It consists of the tank 43 which can be closed with the lid 44. The shaft of the centrifuge motor 45 passes through the lid 44. Inside of the tank 43, conventional filter elements 46 can be fastened to this shaft, which contain contaminated fluorinated lubricant. Filter elements of this kind are often used in plants for the production of semiconductors. Centrifuged lubricant flows through the coarse filter 34 into the collecting tank 33.

The operation of the centrifuge 42 can be included in the automatic control of the purifying apparatus.

For example, during a purification phase, which can amount to from ½ to 5 hours, a filter cartridge 46 previously mounted in the centrifuge 42 can be centrifuged. The turning on and off of the motor 45 can be performed by the control unit 14 which is connected by the signal line 47 to the centrifuge motor.

The recovery and purification of inert lubricants from filter cartridges can be performed, for example, as follows: The vacuum pump 21 is filled with lubricant. The contaminated filter element 46, filled with lubricant, is removed from the filter of the vacuum pump in use. The lubricant, which flows out without additional adjuvants, is delivered through the line 3 and the coarse filter 34 into the collecting tank 33. The filter element 46 with the remaining lubricant is fastened to the shaft of the centrifugal motor 45. By closing the lid 44 and operating a switch on the central unit 14 an automatic process is started, which is timed either by an automatic system or by setting a time switch. By this operation the following functions are started:

The centrifuge motor 45 is turned on, and the centrifuged lubricant runs through the coarse filter 34 into the collecting tank 33.

With valves 35 and 12 closed, the vacuum pump 21 starts and the purification process is begun.

At the end of the preselected time the following functions are automatically initiated: The centrifuge motor 45 and the vacuum pump 21 are shut off. The valve 12 opens, and the purified lubricant is drained into the receiving tank 13. After a given amount of time, the valve 12 is closed, valve 35 is opened, and thus contaminated lubricant is again let into the vacuum pump 21. Valve 35 closes when the desired amount of lubricant has been admitted to the vacuum pump 21. The lid 44 of the centrifuge 42 allows itself to be opened after the centrifuge motor 45 stops, the centrifuged filter element 46 can be replaced with another filter element, and the described process can be started again after the lid 44 has been closed.

The terms and expressions which have been employed are used as terms of description and not a limitation, and there is no intention in the use of such terms and expressions of excluding any equivalents of the features shown and described or portions thereof, it being recognized that various modifications are possible within the scope of the invention.

We claim:

1. A system for separating impurities from a hydrogen free fluorinated lubricant comprising in combination: filter means having as adsorbing material activated alumina or a substance containing activated alumina; means for passing said lubricant through said filter means; degassing means to remove volatile impurities from said lubricant, said degassing means having an area of closed suction; means for passing said lubricant into said degassing means; pressure measuring means to measure the pressure in said closed area; control means to control said degassing means based on said pressure measurement; and monitoring means to monitor the quality of the filtered lubricant.

2. The system of claim 1, wherein the degassing means and a collecting means are connected by conduit means having a pumping means therein.

3. The system of claim 1, wherein the degassing means is a lubricant sealed displacement vacuum pump having a low pressure area.

4. The system of claim 3 further comprising a gas ballast means.

5. The system of claim 1 further comprising means for recovery of inert lubricants from said filter.

6. The system of claim 1, further comprising circulating means whereby the lubricant is recirculated through the filter means and degassing means.

7. The system of claim 1 further comprising: gas ballast means, said gas ballast means adapted to be closed during the pressure measurement.

* * * * *